United States Patent [19]

Archung

[11] Patent Number: 4,704,865
[45] Date of Patent: Nov. 10, 1987

[54] HYDRAULIC RESERVE SYSTEM FOR AIRCRAFT

[75] Inventor: Ralph Archung, Issaquah, Wash.

[73] Assignee: The Boeing Company, Seattle, Wash.

[21] Appl. No.: 631,226

[22] Filed: Jul. 16, 1984

[51] Int. Cl.⁴ .......................................... F16D 31/02
[52] U.S. Cl. ................................. 60/405; 60/428; 60/430; 91/32; 244/226
[58] Field of Search ................. 60/405, 421, 422, 428, 60/429, 430; 244/78, 226; 91/32, 33

[56] References Cited

U.S. PATENT DOCUMENTS

| | | |
|---|---|---|
| 1,390,446 | 9/1921 | Jerdone, Jr. . |
| 2,678,004 | 8/1950 | Harris . |
| 2,834,182 | 5/1958 | Culbertson . |
| 2,836,230 | 5/1958 | Cruckshank . |
| 2,866,315 | 12/1958 | Schakel . |
| 2,871,656 | 2/1959 | Johnson . |
| 2,932,164 | 4/1960 | Watson . |
| 2,940,516 | 6/1960 | Muraszew . |
| 2,994,193 | 6/1956 | Friedmann . |
| 2,996,881 | 8/1961 | Gardiner . |
| 3,050,937 | 8/1962 | James et al. . |
| 3,230,070 | 2/1963 | Tripp . |
| 3,273,116 | 3/1963 | Quiros et al. . |
| 3,671,142 | 6/1972 | Calabrese ........................ 417/36 |
| 3,722,217 | 3/1973 | Reynolds et al. . |
| 3,939,383 | 2/1976 | Alm . |
| 4,033,115 | 7/1977 | Baits . |
| 4,321,016 | 3/1982 | Sakamoto et al. ............ 417/900 X |
| 4,401,412 | 8/1983 | Salina et al. ..................... 417/28 X |
| 4,428,196 | 1/1984 | Boehringer .................... 60/430 X |

OTHER PUBLICATIONS

Hydraulics & Pneumatics article "Airbus Hydraulic Power Always Available" by C. D. Galy, Dec., 1972.

Primary Examiner—Edward K. Look
Attorney, Agent, or Firm—Hughes & Cassidy

[57] ABSTRACT

A hydraulic system for an aircraft to provide improved reserve capability for the steering and reserve brake power system. There is a fluid reservoir having a vent tube with an inlet location located above the bottom wall of the reservoir. In the event that fluid in the reservoir reaches a predetermined low level, supply and pressure isolation valves isolate at least one pump from the rest of the hydraulic system, with a reserve supply of fluid being available for supplying power for the steering wheel and reserve brakes.

20 Claims, 4 Drawing Figures

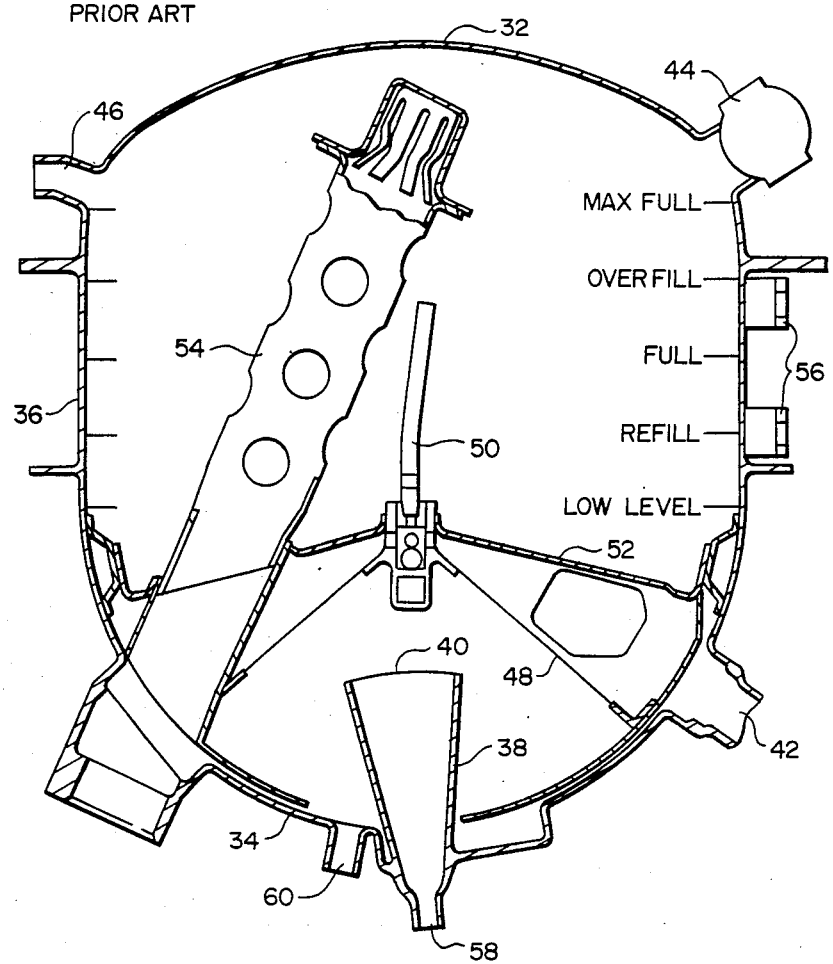

HYDRAULIC RESERVE SYSTEM FOR AIRCRAFT

BACKGROUND OF THE INVENTION

1. Technical Field

The present invention relates to a method and apparatus for a hydraulic system for aircraft, and more particularly to such a system having improved backup or reserve capability.

2. Background Art

In modern day aircraft, a hydraulic system is commonly used to provide power for various operating components of the aircraft, such as wing flaps, control surfaces, thrust reversers, and also steering and brakes for the landing gear. For reasons of safety, it is quite common to provide redundant hydraulic systems. Thus, if one of the hydraulic systems is damaged or malfunctions, another hydraulic system could take over to provide adequate power. For components such as control surfaces, there may be as many as three or more separate hydraulic systems to provide a yet greater margin of safety, but for other functions such multiple redundancy may not be required.

Another technique in providing a backup system is to supply a single hydraulic system itself with a reserve supply, so that even though a portion of a single hydraulic system is damaged, the reserve supply may be used at least to a limited extent. More specifically, in many aircraft, there is a reservoir of hydraulic fluid that has a standpipe which has an inlet opening that is positioned a moderate distance above the floor of the reservoir and closer to a central location in the reservoir. Thus, if the aircraft experiences negative G loads, so that the fluid in the reservoir tends to rise toward the top of the reservoir, the inlet of the standpipe will still be surrounded by hydraulic fluid, thus avoiding the potential problem of the hydraulic pumps ingesting air from the interior of the reservoir.

While the primary purpose of such a reservoir arrangement is to avoid drawing air into the hydraulic system under negative G loading, this particular reservoir arrangement has been used in the prior art as part of a backup subsystem for that particular hydraulic system. In normal operation, one or more pumps will draw fluid from the reservoir and direct this fluid to a certain use location (i.e. to operate the thrust reversers, flaps, etc.). This same fluid will be recirculated back to the reservoir, with the volume of fluid in the reservoir normally remaining constant, and under normal G loading, will be well above the level of the standpipe.

However, let it be assumed that there is a leak in one of the lines of the hydraulic system. As the pump continues to deliver fluid, the level of the reservoir will drop. The aircraft's monitoring system will normally note the loss of fluid, and as this comes to the pilot's attention, he may shut off that particular hydraulic system in the hopes of avoiding further loss of fluid.

However, let it be assumed that fluid continues to be lost until the level in the reservoir reaches the height of the inlet to the standpipe. At this point, there will be no further fluid flow from the reservoir, so the fluid that remains below the level of the standpipe inlet would not yet be lost. In some prior art aircraft, this fluid that remains in the reservoir below the level of the standpipe can be made available by utilizing an alternate reservoir outlet opening which is located at the bottom wall of the reservoir. In addition, there is provided a valve isolation system which would limit the flow of this backup supply of fluid to a particular isolated system of the aircraft for which this backup system is intended.

While there are advantages to such a system, there is a continuing need in aircraft design to provide such systems in a manner to provide an overall balance of desirable characteristics, such as effectiveness and reliability of operation, simplicity of design, keeping the overall weight of the system within reasonable limits, compatibility with other systems of the aircraft, and also convenience and ease of pilot operation. Therefore, it is an object of the present invention to provide such a hydraulic system with a desirable balance of the features noted above.

A general search of the patent literature has disclosed a number of fluid systems for aircraft and other devices. While some of these are believed to have at best marginal relevance to the present invention, these are being noted to insure that there is a full disclosure of all possibly relevant prior art brought to the attention of the applicant. These are as follows. U.S. Pat. No. 1,390,446, Jerdone Jr., discloses a fuel reserve supply system where there is a main fuel tank and a reserve fuel tank. There is a system by which the fuel can be moved from one tank to another in a predetermined manner.

U.S. Pat. No. 2,678,004, Harris, shows a control means for liquid fuel pumps. More particularly, there is an isolating valve which becomes operative when there is a fracture of an associated pipe.

U.S. Pat. No. 2,866,315, Schakel, shows a hydraulic system for a variable exhaust nozzle for a jet engine. The hydraulic system moves the vanes of the nozzle inwardly or outwardly to vary the area of the nozzle so as to optimize the thrust developed. However, in the event that there is a loss of pressure in the hydraulic system, the force of the gaseous exhaust would tend to move the vanes to a more open position, which would normally not be the optimum position for efficient operation. The hydraulic system is arranged so that if there is a loss of pressure, the vanes are automatically locked in the more constricted operating condition. Upon restoration of pressure to the hydraulic system, the locking mechanism is decommissioned so that the vanes can again be moved inwardly or outwardly.

U.S. Pat. No. 2,834,182, Culbertson, shows a control system for the exhaust nozzle of a jet engine. This patent relates essentially to an improved emergency control apparatus comprising an emergency electrical power circuit.

U.S. Pat. No. 2,836,230, Cruckshank, discloses an emergency fuel pumping system, where the discharges of the main and reheat fuel boost pumps are interconnected with a pressure responsive valve means, for selectively controlling the discharge from the reheat fuel boost pump.

U.S. Pat. No. 2,871,656, Johnson, discloses a thrust reverser where the apparatus is controlled by a temperature sensitive control mechanism.

U.S. Pat. No. 2,932,164, Watson, shows a thrust reverser system that is "fail-safe", in that it will retract due to the forces applied to the blades of the thrust reverser by the jet stream if the reverser actuating mechanism fails.

U.S. Pat. No. 2,940,516, Muraszew, discloses an emergency fuel system where the emergency control unit is brought into operation to bypass the normal fuel controls and to provide an adjustable throttle to control the engine during an emergency.

U.S. Pat. No. 2,994,193, Friedmann, shows a thrust reverser for jet engines that has a fail-safe feature. If the hydraulic power system of the aircraft fails, the rearward flow of the exhaust gases will automatically return the blockage flaps to the normal position to allow unopposed flow of the exhaust gases outwardly of the exhaust nozzle.

U.S. Pat. No. 2,996,881, Gardiner, shows a thrust reverser for a jet engine having a fail-safe feature in that if the controls should fail, the thrust reverser will automatically be positioned to provide full forward thrust.

U.S. Pat. No. 3,050,937, James et al, shows another thrust reverser for a jet engine, where in the event that there is a power failure, the thrust reverser elements are driven toward their retracted or forward-thrust position by the force of the discharging gases.

U.S. Pat. No. 3,230,706, Tripp, is directed to the problem of leakage in the propellant system of a space vehicle. In the event that there is a large leak, all of the injector line valves are closed and then selectively opened, so that the major offender may be detected.

U.S. Pat. No. 3,273,116, Quiros et al, illustrates a safety system for hydraulic brakes in automobile vehicles. When a leak is detected, it is isolated from other portions of the system so that the intact portions of the system can remain operative.

U.S. Pat. No. 3,722,217, Reynolds et al, discloses an emergency hydraulic power supply where there is a hot gas turbine driven from a fuel supply to supply the hydraulic power.

U.S. Pat. No. 3,939,383, Alm, discloses a liquid level monitoring device to detect leakage from a body of liquid.

U.S. Pat. No. 4,033,115, Baits, discloses an emergency hydraulic system where there is a hot gas turbine to drive a hydraulic pump.

SUMMARY OF THE INVENTION

The hydraulic system of the present invention is designed to be utilized in an aircraft. It comprises a fluid reservoir that has a containing structure defining a fluid containing chamber and having a top wall and a bottom wall. The reservoir further comprises a first fluid inlet means having a first fluid inlet opening located at a position spaced above the bottom wall and below the top wall. The chamber has an upper chamber portion located above the first inlet opening, and a lower chamber portion located below the first inlet opening. A second fluid inlet means has a second fluid inlet opening located below the first inlet opening at an inlet location at a lower part of the lower chamber portion.

There are first and second hydraulic power outlet means. There is a pump means to draw fluid from the reservoir and to deliver fluid to the first and second power outlet means.

There is a first supply isolation valve having a first position and a second position. This valve is operatively connected to the first and second inlet means and to the pump means. The supply isolation valve in its first position delivers fluid from the first inlet means to the pump means, and in its second position delivers fluid from the second inlet means to the pump means.

There is a second pressure isolation valve operatively connected to the pump means and having a first position and a second position. The pressure isolation valve in its first position permits flow from the pump means to the first power outlet means, and in its second position, blocks flow from the pump means to the first power outlet means, while permitting flow from the pump means to the second power outlet means.

There is fluid level monitoring means to detect when fluid level in the chamber is at or below a predetermined caution level, and to produce a corresponding low level signal.

There is control means to become operative in response to the low level signal to move at least the pressure isolation valve to its second position. Thus, in the event of fluid loss in the system, the pressure isolation valve in its second position is able to alleviate loss of fluid for the pump means, and the supply isolation valve in its second position is able to direct fluid from the lower chamber portion to the pump means.

In the preferred form, the control means is arranged, when becoming operative, to also move the supply isolation valve from the first position to the second position. Further, in the preferred form, the control means comprises magnetic latch relay means responsive to the low level signal to become latched and cause the first and second valves to move to their second positions.

More specifically, there is air/ground logic means arranged to provide a signal to indicate an airborne condition and to transmit an airborne signal. Then the control means is arranged to become operative only when both the low level signal and the airborne signal are present. Yet more specifically, there is also a switch means having an automatic setting to transmit an "auto" signal. In this arrangement, the control means is responsive to become operative only in response to a condition where all three of the low level signal, airborne signal, and "auto" signal are present. Also more specifically, the system switch means has an "on" condition, which causes the first and second valves to move to their second positions, and also to start the pump means to operate. In this arrangement, there is indicating means responsive to a condition when the switch means has been moved to the "on" position, and the pump means is not delivering adequate fluid pressure.

Further, there is another indicating means responsive to a command signal being transmitted to the pressure isolation valve to move it to its second position, and also responsive to the position of the supply isolation valve, in a manner to indicate when said supply isolation valve and said pressure isolation valve are not positioned in their commanded positions.

In the preferred form, there is a steering and reserve brake hydraulic system, and the second power outlet is operatively connected to this steering and reserve brake system.

Further, in the preferred embodiment, there is also a second pump means, in addition to the first pump means recited above. When the second pressure isolation valve is moved to its second position, this second pump means is isolated from the second power outlet means.

Other features of the present invention will become apparent from the following detailed description.

BRIEF DESCRIPTION OF THE DRAWING

FIG. 2 is a view of the fluid reservoir of the system of FIG. 1, this being a view taken partly in section, with the section line being through the vertical centerline of the reservoir.

DESCRIPTION OF THE PREFERRED EMBODIMENT

The present invention is particularly designed to be used in conjunction with hydraulic systems which are presently in use in many modern day aircraft. Accordingly, it is believed that a clearer understanding of the present invention will be obtained by first examining the apparatus and operation of such a prior art hydraulic system.

Figure 1A:
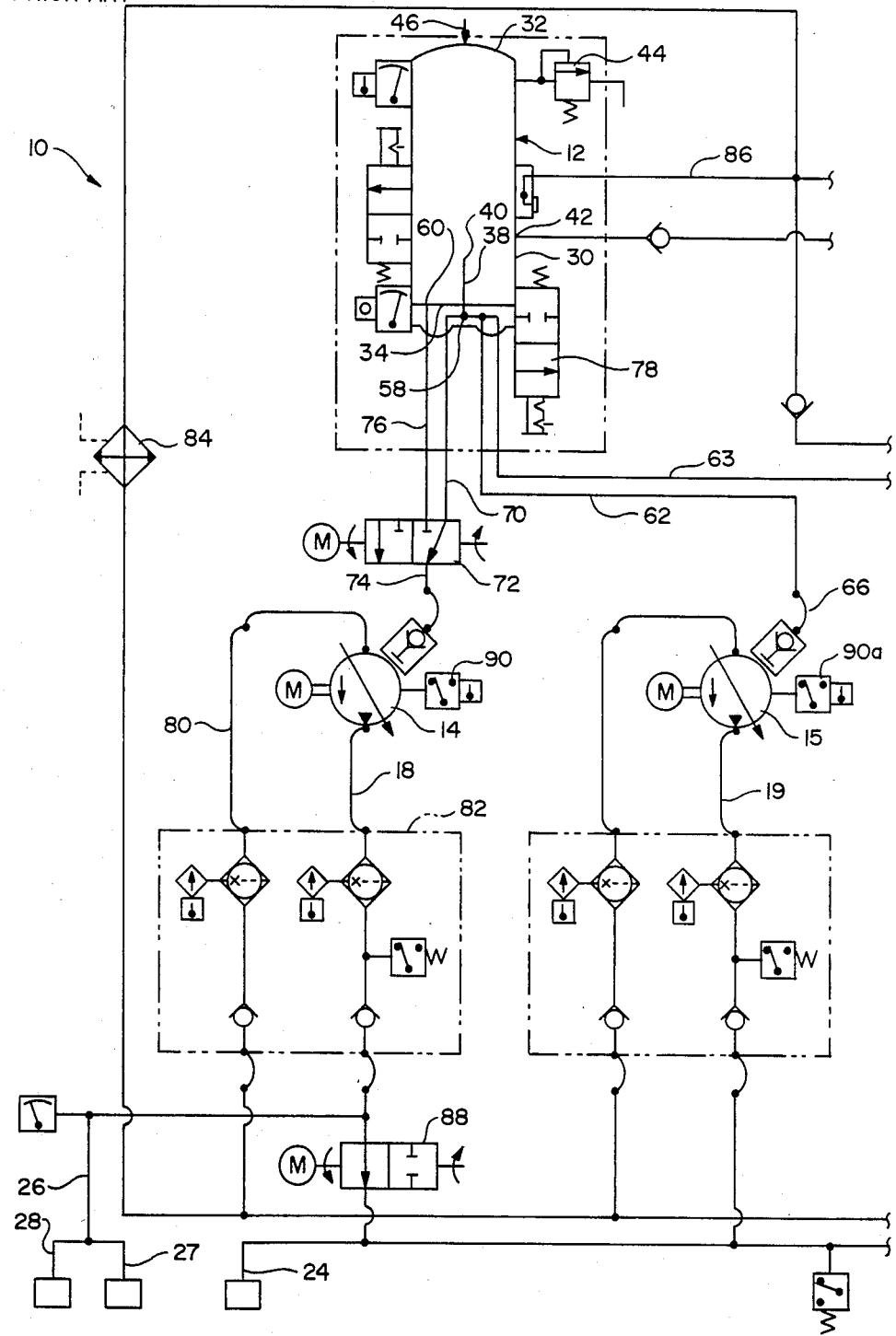
FIGS. 1a and 1b are schematic drawings of a prior art hydraulic system adapted for use as one of several hydraulic systems in present day aircraft.
Figure 1B:
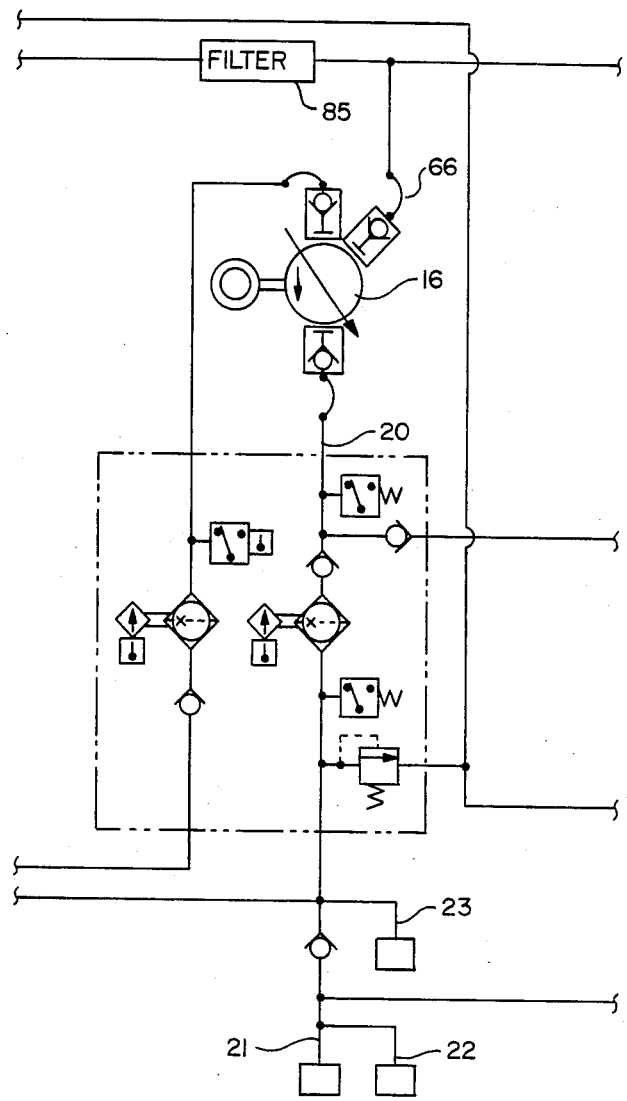

With reference to FIG. 1, there is shown schematically a prior art hydraulic system, generally designated 10, in use in present day jet aircraft. Specifically, this particular prior art hydraulic system is one of three hydraulic systems that exist in the aircraft, and this particular system 10 is a center system designed to be powered from the electrical and pneumatic systems of a commercial jet aircraft.

This prior art system 10 comprises a reservoir 12 that supplies the hydraulic fluid for the system. There are three pumps that draw fluid from the reservoir 12, namely two main A.C. powered pumps 14 and 15, and a pneumatically powered demand pump 16. The pumps 14 and 15 are normally used together to provide the primary power requirements of the system 10. The demand pump 16 is normally used only to provide additional pumping capacity. A typical example for use of the demand pump 16 would be where several of the hydraulically powered systems on the airplane are operating simultaneously, and the capacity of the two pumps 14 and 15 is not sufficient to maintain adequate pressure in the hydraulic lines.

The output from the three pumps 14, 15 and 16 are directed through hydraulic lines 18, 19 and 20, respectively, to supply hydraulic fluid for several of the systems in the airplane, either as the primary power source or as a backup power source. In the particular example shown herein, the fluid is directed through the line 21 to the lateral control surfaces (i.e. ailerons and spoilers), through line 22 to the empennage flight control systems (i.e. the horizontal stabilizer, elevator and rudder), through line 23 to leading and trailing edge flap systems, and through line 24 to the main landing gear. The hydraulic fluid that passes through line 26 is directed to the wheel brakes through line 27 and to the nose wheel steering apparatus through line 28.

In a typical system such as that described above, the hydraulic system 10 can be one of two or more separate hydraulic systems for an aircraft. Typically, all of the systems would have the capability of supplying hydraulic fluid to the lateral control surfaces and also to the empennage flight control systems, with this multiple redundancy making it highly unlikely that there would be, at any one time, total lack of power to these control surfaces. On the other hand, in a system such as this, it would be common for only this single hydraulic system 10 to be used to supply power to the nose wheel steering apparatus.

To describe this prior art system 10 of FIG. 1 more specifically, the fluid reservoir 12 is typically a rigid tank defining a chamber 30 of constant volume, and it has a top wall 32, a bottom wall 34, and a side wall 36. The reservoir is shown in more detail in FIG. 2, and it can be seen that there is a standpipe 38 having an upper inlet opening 40 positioned a moderate distance above the bottom wall 34. There is a return port 42 through which fluid is returned to the reservoir 12, a relief valve 44 and an air pressure port 46. During normal operation, the reservoir 12 is partially filled with fluid, and the remaining air space in the reservoir is pressurized to a predetermined level through the port 46.

Just below the middle of the reservoir 12, there is provided a screen 48 which permits passage of fluid therethrough at a reduced flow rate. Extending upwardly from the middle of the screen 48 is a foam tube 50. This enables any foam, which might be present in the fluid, to flow upwardly and out of the tube 50, rather than being directed to the lower part of the reservoir where it would possibly flow outwardly through the standpipe 38 and into the hydraulic system. Support struts are provided at 52 to mount the tube 50.

A fluid level signal transmitter 54 is mounted to the bottom wall 34 and extends upwardly through the reservoir chamber 30. This transmitter 54 provides an electrical signal which indicates the level of fluid in the chamber 30, and in FIG. 2, five such levels are indicated, namely "max full", "overfill", "full", "refill", and "low level" caution. Further, two sight gauges 56 are provided.

There are two fluid outlets from the reservoir 12, one outlet, indicated schematically at 58, extends from the bottom of the standpipe 38. A second outlet, indicated schematically at 60 extends from a lowermost point of the wall 34. Thus, fluid is able to flow into the inlet 40 of the standpipe 38 and thence through the opening 58 only until the fluid reaches the level of the standpipe 40. However, the opening 60 is able to receive substantially all of the fluid in the reservoir 12, including that which is positioned below the level of the standpipe level 40.

With reference being made again to FIG. 1, the fluid inlet 58 leads first through lines 62 and 63 to the fluid inlets of the main pump 15 and the demand pump 16. Quick disconnect hoses and related check valves (these being typical in the prior art) are indicated at 66 at the inlet of the pumps 15 and 16. It will be noted that there are other such check valves and quick disconnect hoses at other locations in the schematic drawing of FIG. 1, but for ease of description these will not be discussed nor given numerical designations.

The standpipe outlet 58 also leads through line 70 to the inlet side of a supply isolation valve 72, the outlet side of this valve 72 connecting to a line 74 that leads to the inlet side of the pump 14. The second reservoir outlet 60 leads through a line 76 to the inlet side of the supply isolation valve 72. With the valve 72 in the position shown in FIG. 1, flow through the line 76 is blocked, while fluid can be supplied from the standpipe outlet 58 to the pump 14. When the valve 72 is moved to its second position, the standpipe outlet 58 is isolated from the pump 14, but fluid can flow through the reservoir outlet 60 through the valve 72 to the pump 14. Also, there is shown in FIG. 1 a drain valve 78 connected to the second reservoir outlet 60.

To turn our attention now to the operation of the pump 14, as indicated previously, the pump 14 delivers its fluid through the line 18 to provide power to other systems in the airplane. In addition, there is secondary case drain fluid flow from the pump case through a line 80. The flow through lines 18 and 80 passes through a filter module/pressure and case drain component, indicated generally at 82. The flow in the line 18 passes through the component 82 and then flows through the appropriate line or lines 21-24 and 26-28 to supply power to the other airplane systems (this having been described previously herein). The flow through the line 80 that passes through the component 82 then passes through a heat exchanger 84, and thence back through a main return line 86 which in turn connects to the return port 42 in the reservoir 12.

The other two pumps 15 and 16 also have case drain fluid flow lines (designated 80a and 80b), and a filter module/pressure and case drain component (designated 82a and 82b). The lines 80a and 80b from the pumps 15 and 16 also lead to the heat exchanger 84, with the flow from the heat exchanger 84 returning to the reservoir 12 through the return line 86.

There is a pressure isolation valve 88 positioned between the line 18 (which leads from the pump 14) and the lines 21-24. Further, this valve 88 is positioned between the lines 19 and 20 (which lead from the pumps 15 and 16) and the line 18. Thus, with the valve 88 in the open position, as shown in FIG. 1, the pump 14 communicates through the line 18 to not only the outlets 21-24, but also to the outlet lines 26-28. However, with the valve 88 closed, flow from the pump 14 through the line 18 is isolated from the lines 21-24. In like manner, with the valve 88 in the open position of FIG. 1, the pumps 15 and 16 communicate through lines 19 and 20, respectively, with all of the lines 21-24 and 26-28. However, with the valve 88 in the closed position, the pumps 15 and 16 communicate through lines 19 and 20 only to the lines 21-24, but are isolated from the lines 26-28.

To describe the operation of the prior art hydraulic system 10 of FIG. 1, the pumps 14 and 15 operate as needed to supply the normal hydraulic power requirements, and the pumps 14 and 15 draw fluid from the reservoir 12 through the opening 40, standpipe 38 and lines 62 and 70. The fluid delivered to the other system or systems of the airplane is returned to the reservoir through the return lines 86, but first passes through a filter 85. In the event that the power requirements imposed on the system 10 exceed what the pumps 14 and 15 are able to deliver, the pump 16 begins to operate to supply the additional hydraulic fluid.

During this normal mode of operation, the supply isolation valve 72 is in the position shown in FIG. 1 so that all three pumps 14-16 draw in hydraulic fluid only from the standpipe inlet 40. Also, during this normal mode of operation, the pressure isolation valve 88 remains in the open position as shown in FIG. 1.

However, let it be assumed that a leak develops in the hydraulic system 10, and let it further be assumed that this leak occurs downstream of the pump 15 in the lines 21-24, or possibly in the systems served by those lines. As fluid is lost, the flow of fluid back to the reservoir 12 decreases relative to the outflow, and the fluid level in the reservoir 12 becomes lower. When the fluid level reaches the "low level" caution stage, the signal transmitter 54 will provide a signal which in turn will activate an amber "QTY" light 96 to indicate to the pilot that the fluid in the system 10 is low. At this point, depending upon a number of circumstances, the pilot may or may not decide to shut down the hydraulic system 10. In many instances, the pilot would not immediately shut down the hydraulic system 10.

As the fluid level continues to drop in the reservoir 10, it would eventually reach the level of the inlet 40 of the standpipe 38. At this time, the pumps 14 and 15 would lose their supply of fluid, and the pressure output from the pumps 14 and 15 would drop. This in turn would activate a pressure switch, such as that shown at 90a in FIG. 1, which in turn would signal the pilot that pressure has dropped in the system 10. At this point, the pilot will normally turn the control for the pump 16 from the "auto" to the "on" position to see if pressure is restored. If pressure is not restored, then the pilot would shut down the system 10 by turning the pumps 14-16 off. Upon shutdown of the system 10, it is assumed that one or more of the other hydraulic systems are operating so that there is adequate hydraulic power delivered to the control services which would otherwise be served by the lines 21 and 22.

When the system 10 is so shut off, there is still a supply of fluid in the reservoir 12, this being the fluid which is above the floor 34 of the reservoir 12 and below the level of the standpipe 40.

Let it now be assumed that the airplane makes a landing and it is desired to operate the nose wheel steering apparatus that is served by the system 10. To accomplish this, the pressure and supply isolation valves 88 and 72 would be moved from the position shown in FIG. 1 so that fluid is delivered from the second lower reservoir outlet 60 into the line 74 to the pump 14. With the pressure isolation valve 88 being closed, the pump 14 would deliver this hydraulic fluid only through the line 26 and through the line 28 to the nose wheel steering apparatus. Hydraulic fluid power would also be available to the reserve brakes through the line 27 if required. Normal braking would be provided by the right hydraulic system if it were intact. Return fluid would be delivered back to the reservoir 12 through the line 86. Thus, it can be appreciated that even though the nose wheel steering apparatus is served only by the system 10, and even though there is a failure in one part of the system 10 (i.e. that part that has been isolated from the reserve brakes and nose wheel steering apparatus), it is still possible to use the reserve supply of fluid in the reservoir 12 to operate the reserve brakes and steering apparatus served by the system 10. Even though the system described above is an overall effective means of accomplishing these various functions, there has been continuing effort to improve various aspects of the system. This leads us to a description of the present invention.

Figure 3:
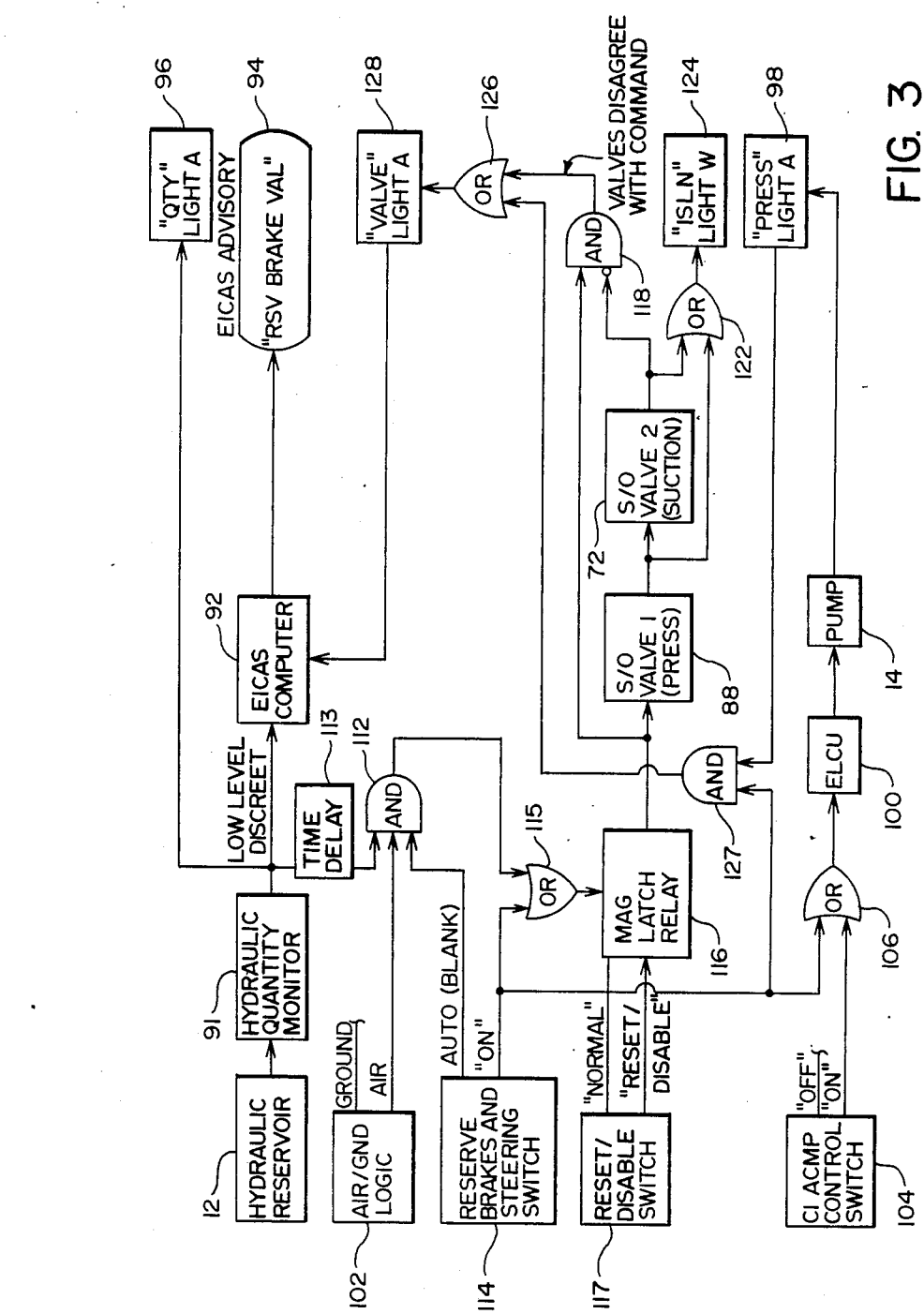
FIG. 3 is a block diagram illustrating certain components of the present invention utilized in conjunction with the system shown in FIG. 1.

To describe the apparatus of the present invention, reference is now made to FIG. 3, which shows certain components of the present invention used in conjunction with the system shown in FIG. 1.

In describing the various components illustrated in FIG. 3, there will first be a brief recitation of those components which normally would already exist in the airplane, some of which have already been described above. With regard to the components which have already been described, there is the hydraulic reservoir 12, the pump 14, the pressure isolation valve 88, and the supply isolation valve 72.

In addition, there is a hydraulic quantity monitor 91 that receives a signal from the fluid level signal transmitter 54. There is an EICAS (i.e. engine indicating and crew alerting system) computer 92 which operates an EICAS advisory upper display 94. The EICAS computer 92 obtains inputs from a variety of sources in the airplane, processes these through the computer to derive certain information, and then displays this information on the display screen 94. The display screen 94 is commonly a CRT (cathode ray tube) screen positioned on the pilot's main instrument panel.

There is a quantity light 96 which indicates that the fluid in the reservoir 12 has reached the "low level", which is indicated in FIG. 2. There is also a pressure light 98 which indicates when the pump 14 is operating and is not developing adequate hydraulic pressure at its outlet. Also, there is an ELCU component 100 which is essentially a circuit breaker operatively connected to the pump 14.

There is an air/ground logic system represented by component 102. This is used to indicate whether or not the airplane is in flight or on the ground, and is used to provide inputs to various systems in the airplane. Quite commonly, this component 102 is made responsive to a signal transmitter in the landing gear that indicates whether or not there is ground contact. A pump control switch 104 is also provided, and this in turn leads to a an OR gate 106.

It is to be understood that the components described above exist in and of themselves in the prior art. However, the manner in which these various components are utilized in conjunction with the components added in the present invention is believed to be new and provide a combination of elements which results in the unique functions of the present invention.

To proceed now to a description of those components which have been added particularly for use in the present invention, there is an AND gate 112. The output from the quantity monitor 91 goes through a time delay 113 to one of three input terminals of an AND gate 112, and also to the quantity light 96. There are two other inputs to the AND gate 112. One of these inputs is from the air/ground logic component 102, which gives a signal to the AND gate 112 when the airplane is airborne. The third input to the AND gate 112 is from the "auto" output from the reserve brake and steering switch 114. Thus, when three conditions occur simultaneously, the AND gate 112 delivers an output signal, these three conditions being the following:

(a) The hydraulic quality monitor 91 gives a low fluid level output signal;

(b) The air/ground logic system 102 indicates that the airplane is airborne;

(c) The reserve brake and steering switch 114 is in its "auto" position.

The output from the AND gate 112 acts through an OR gate 115 to activate a magnetic latch relay 116 and cause this relay 116 to move from its normal position to its "isolating" position where it sends a signal to the pressure isolation valve 88. In the following description, the relay 116 will be considered as "open" when it is in its normal position and as "closed" when it has moved to the position to move the valve 88 to its closed or isolated position. This relay 116 remains closed until a reset disable switch 117 is moved to its "reset/disable" position, which then positively moves the latch 116 against the urging of its magnetic element to the open position.

When the relay 116 closes, it first moves the pressure isolation valve 88 to its closed position to isolate the pump 14 from the hydraulic lines 21–24. As soon as the valve 88 closes, it transmits a signal to the supply isolation valve 72 to cause that valve 72 to move to its second position where the line 74 leading to the pump 14 connects to the line 76 leading from the second reservoir outlet 60. When the movement of the supply isolation valve 72 to its second position is completed, it transmits a signal to two locations. First, it transmits an inverted signal to an AND gate 118, and also a direct signal to an OR gate 122.

The other input terminal of the OR gate 122 connects to the output of the pressure isolation valve 88. When either of the valves 88 or 72 move to their second positions (i.e. the positions not shown in FIG. 1), or when both of the valves 88 and 72 have moved to their second positions, the OR gate 122 produces an output signal which is directed to the isolation light 124. This isolation light 124 is visible in the flight deck and indicates that the pump 16 is in the process of being isolated from the lines 18, 22, and 24, or already has been isolated from such lines.

The function of the AND gate 118 is to sense a condition when either of the valves 88 or 72 has not moved to its respective commanded position. The output from the AND gate 118 is one of two inputs to an OR gate 126. A second input to the OR gate 126 is from an AND gate 127 which receives its input from the pump 14, pressure light 98 and the "on" position of the reserve brake and steering switch 114. The output of the OR gate 126 goes to the "VALVE" light 128, which in turn sends a signal to the EICAS computer 92.

Thus, the VALVE light 128 signals either of two conditions which would be present when the isolation function of the present invention is not fully operative. These two conditions are the following:

(a) Either of the isolation valves 88 and 72 is not in their respective commanded positions;

(b) The pump 14 has been commanded to come on, but is not delivering adequate pressure to cause the isolation backup system to operate. (However, this condition will not be indicated until the switch 114 is moved to the "on" position.)

To review the overall operation of the present invention, let us assume that the pilot is about to begin operation of the airplane. Normally, the reserve brake and steering switch 114 would be placed in its "auto" position.

Let it now be assumed that the airplane is airborne and that a hydraulic leak develops in the system 10. Let it further be assumed that this leak develops in a portion of the system 10 which can be isolated from the pump 14 by movement of the valves 88 and 72 to their second positions (i.e. the positions not shown in FIG. 1). As indicated previously, the leak will cause the fluid level in the reservoir 12 to drop, which in turn will eventually activate the hydraulic quantity monitor 91. A short time delay between monitor 91 and AND gate 112 acts to prevent a false "low level" signal. A true "low level", however, sends an immediate output signal to the EICAS computer 92, to the quantity light 96 to give a visible indication to the pilot that the fluid has reached a predetermined low level, and also after a 0.3 second time delay in this specific case by action of the time delay 113 to one of the three input terminals to the AND gate 112.

Since the air/ground logic component 102 is already sending a signal to the AND gate 112 that the airplane is airborne, and since the reserve brake and steering switch 114 is already in the "auto" position and thus sending a signal to the AND gate 112, the additional input from the hydraulic quantity monitor 91 causes the AND gate 112 to produce an output signal which causes the latch 116 to close. As soon as the relay 116 closes, it causes two things to happen in sequence, namely:

(a) First, the pressure isolation valve 88 moves to its closed position;

(b) Second, upon closure of the valve 88, a signal is transmitted to the supply isolation valve 72 to move to its second position;

In addition to causing the two sequential operations noted above, there are certain signals that are transmitted to the signal components. First, during the brief interval where the signal is transmitted from the relay 116 to the pressure isolation valve 88, but there is not yet an output signal upon movement of the supply isolation valve 72, the AND gate 118 will produce a brief signal which is transmitted to the VALVE light 128. This brief flash, approximately two seconds, of the VALVE light 128 would indicate to the pilot that the valves 88 and 72 are in the process of moving to their isolating positions. (If either valve 88 or 72 does not fully close, the VALVE light 128 will remain on.) Also, a signal would be passed to the OR gate 122 to activate the isolation light 124.

To continue with the description of the operation of the present invention, let it be assumed that upon completion of the steps noted above, the leak in the hydraulic system continues to cause fluid to be lost from the system so that the fluid level in the reservoir 12 continues to drop. This fluid loss will continue until the liquid level reaches the level of the inlet 40 of the standpipe 38, after which no more fluid will be delivered to the pumps 15 and 16, causing the pumps 15 and 16 to run dry. This would cause a low pressure signal light for the pumps 15 and 16 to be activated, and the pilot, upon observing the low pressure light being activated, would likely shut down all three pumps 14–16. However, on the assumption that the movement of the valves 72 and 88 to their isolating position had previously isolated the pump 14 from the leak, the pump 14 and also the lines 74, 26, 27 and 28 would still be filled with hydraulic fluid. Thus, one of the significant advantages of the present invention now becomes apparent. Not only is there a reserve supply of hydraulic fluid existing in the reservoir 12 (this being the fluid that is located in the chamber 30 below the inlet 40 of the standpipe 38), but there is the additional fluid which remains in the pump 14 and the associated lines which have been isolated earlier from the remainder of the system 10 that is subjected to the leak.

To further continue the description of the operation of the present invention, let it now be assumed that the airplane is making the approach for landing. The pilot then moves the reserve brake and steering switch 114 to the "on" position to cause the pump 14 to operate. If the pump 14 is not developing adequate pressure, the VALVE light 128 will light up to indicate that there is not enough hydraulic pressure to operate the brakes and steering. If the pump 14 is developing adequate pressure, there will be both steering and reserve brake capability.

With regard to the siginficant features of the present invention, it should be noted that this is a semi-automatic system that is retrofittable in aircraft with a manual system, as described above, and does not require a change to previously established pilot flight procedures, in that this system requires the pilot to push the reserve brakes and steering switch 114 on approach to insure the operational integrity of this isolated system. Further, since the pump 14 is not in a location where it would drain back to the reservoir 12 when the reservoir 12 has a low fluid level, it would not be necessary to turn on the pump 14 to preserve the fluid in its case and suction line.

Further, the present system operates the valves 88 and 72 at a sufficiently early time, relative to monitoring fluid level in the reservoir 12, that adequate fluid is maintained in the system. Overall, the system relieves the pilot of the responsibility of isolating the pump 16 in a timely manner and thus prevents loss of pump case fluid which would otherwise be caused by continuous running of the pump following a system failure.

It is to be understood that various changes could be made to the present invention without departing from the basic teachings thereof. While the present invention has been directed to an isolation system for the reserve brake and steering system, it is to be understood that within the broader aspects of the present invention it could be used as a backup device for other components or systems of the airplane.

I claim:

1. A hydraulic system for an aircraft, said system comprising:
    a. a fluid reservoir comprising a containing structure defining a fluid containing chamber and having a top wall and a bottom wall, said reservoir further comprising a first fluid inlet means having a first fluid inlet opening located at a position spaced above said bottom wall and below said top wall, said chamber having an upper chamber portion located above said first inlet opening, and a lower chamber portion located below said first inlet opening, a second fluid inlet means having a second fluid inlet opening located below said first inlet opening at an inlet location at a lower part of said lower chamber portion;
    b. a first hydraulic power outlet means;
    c. a second hydraulic power outlet means;
    d. a pump means to draw fluid from the reservoir and to deliver fluid to the first and second power outlet means;
    e. a first supply isolation valve having a first position and a second position, and being operatively connected to the first and second inlet means and to the pump means, said supply isolation valve in its first position delivering fluid from said first inlet means to the pump means, said supply isolation valve in its second position delivering fluid from the second inlet means to the pump means;
    f. a second pressure isolation valve operatively connected to the pump means and having a first position and a second position, said pressure isolation valve in its first position permitting flow from the pump means to the first power outlet means, and in its second position blocking flow from the pump means to the first power outlet means, while permitting flow from the pump means to the second power outlet means;
    g. fluid level monitoring means to detect when fluid level in said chamber is at or below a predetermined caution level and to produce a corresponding low level signal;
    h. control menas to become operative in response to said low level signal to move at least said pressure isolation valve to its second position;
    whereby in the event of fluid loss in the system, said pressure isolation valve in its second position is able to alleviate loss of fluid for said pump means.

2. The system as recited in claim 1, wherein said control means is arranged, when becoming operative, to also move said supply isolation valve from the first position to the second position.

3. The system as recited in claim 2, wherein said control means comprises latch relay means responsive to said low level signal in a manner to become latched and cause said first and second valves to move to their second positions.

4. The system as recited in claim 2, wherein there is air/ground logic means arranged to provide a signal to indicate an airborne condition and to transmit an airborne signal, said control means being arranged to become operative only when both said low level signal and said airborne signal are present.

5. The system as recited in claim 4, wherein there is a system switch means having an automatic setting to transmit an "auto" signal, said control means being responsive to become operative only in response to a condition where all three of said low level signal, airborne signal, and "auto" signal are present.

6. The system as recited in claim 5, wherein said system switch means also has an "on" condition, to cause the first and second valves to move to their second positions, and also to start said pump means to operate.

7. The system as recited in claim 6, wherein there is indicating means responsive to a condition where said switch means has been moved to the "on" position, and the pump means is not delivering adequate fluid pressure.

8. The system as recited in claim 2, wherein there is indicating means responsive to a command signal being transmitted to said pressure isolation valve to move it to its second position, and also responsive to the position of said supply isolation valve, in a manner to indicate when said supply isolation valve and said pressure isolation valve are not positioned in their commanded positions.

9. The system as recited in claim 2, wherein there is indicating means responsive to operation of said pump means, to indicate a condition where said pump means is not delivering adequate fluid pressure in response to said control means becoming operative.

10. The system as recited in claim 2, wherein there is a steering and reserve brake power system, and said second power outlet means is connected to said steering and reserve brake power system.

11. The system as recited in claim 1, wherein:
   a. said control means is arranged, when becoming operative, to also move said supply isolation valve from the first position to the second position;
   b. said control means comprising latch relay means responsive to the low level signal in a manner to become latched and cause said first and second valves to move to their second positions;
   c. there is air/ground logic means arranged to provide a signal to indicate an airborne condition and to transmit an airborne signal, and also a system switch means having an automatic setting to transmit an "auto" signal, said control means being responsive to become operative only in response to a condition when all three of said low level signal, airborne signal, and "auto" signal are present;
   d. the system switch means also has an "on" condition, which causes the first and second valves to move to their second positions, and also to start the pump means to operate;
   e. there is indicating means responsive to a condition where the switch means has been moved to the "on" position, and the pump means is not delivering adequate fluid pressure;
   f. there is also another indicating means responsive to a command signal being transmitted to said pressure isolation valve to move it to its second position, and also responsive to the position of the supply isolation valve, in a manner to indicate when the supply isolation valve and the pressure isolation valve are not positioned in their command positions.

12. A hydraulic system for an aircraft, said system comprising:
   a. a fluid reservoir comprising a containing structure defining a fluid containing chamber and having a top wall and a bottom wall, said reservoir further comprising a first fluid inlet means having a first fluid inlet opening located at a position spaced above said bottom wall and below said top wall, said chamber having an upper chamber portion located above said first inlet opening, and a lower chamber portion located below said first inlet opening, a second fluid inlet means having a second fluid inlet opening located below said first inlet opening at an inlet location at a lower part of said lower chamber portion;
   b. a first hydraulic power outlet means;
   c. a second hydraulic power outlet means;
   d. a first pump means to draw fluid from the reservoir and to deliver fluid to the first and second power outlet means;
   e. a second pump means to draw fluid from the reservoir and to deliver fluid to the first and second power outlet means;
   f. a first supply isolation valve having a first position and a second position, and being operatively connected to the first and second inlet means and to the first pump means, said supply isolation valve in its first position delivering fluid from the first inlet means to the first pump means, said supply isolation valve in its second position delivering fluid from the second inlet means to the first pump means;
   g. a second pressure isolation valve operatively connected to an outlet line of said first pump means and having a first and a second position, said pressure isolation valve in its first position permitting flow from each of the first and second pump means to the first and second power outlet means, and in its second position blocking flow from the first pump means to the first power outlet means, while permitting flow from the first pump means to the second power outlet means, and blocking flow from the second pump means to the second power outlet means;
   h. fluid level monitoring means to detect when fluid level in said chamber is at or below a predetermined caution level and to produce a low level signal;
   i. control means to become operative in response to said low level signal to move at least said pressure isolation valve to its second position;
whereby in the event of fluid loss in the system, said pressure isolation valve in its second position is able to alleviate loss of fluid for said first pump means.

13. The system as recited in claim 12, wherein said control means is arranged, when becoming operative, to also move said supply isolation valve from the first position to the second position.

14. The system as recited in claim 13, wherein said control means comprises latch relay means responsive to said low level signal in a manner to become latched and cause said first and second valves to move to their second positions.

15. The system as recited in claim 13, wherein there is air/ground logic means arranged to provide a signal to indicate an airborne condition and to transmit an airborne signal, said control means being arranged to become operative only when both said low level signal and said airborne signal are present.

16. The system as recited in claim 15, wherein there is a system switch means having an automatic setting to transmit an "auto" signal, said control means being responsive to become operative only in response to a condition where all three of said low level signal, airborne signal, and "auto" signal are present.

17. The system as recited in claim 16, wherein said system switch means also has an "on" condition, to cause the first and second valves to move to their second positions, and also to start said first pump means to operate.

18. The system as recited in claim 17, wherein there is indicating means responsive to a condition where said switch means has been moved to the "on" position, and the pump means is not delivering adequate fluid pressure.

19. The system as recited in claim 13, wherein there is indicating means responsive to a command signal being transmitted to said pressure isolation valve to move it to its second position, and also responsive to the position of said supply isolation valve, in a manner to indicate when said supply isolation valve and said pressure isolation valve are not positioned in their commanded positions.

20. The system as recited in claim 13, wherein said indicating means is also responsive to operation of said first pump means, to indicate a condition where said first pump means is not delivering adequate fluid pressure in response to said control means becoming operative.

* * * * *